Patented Aug. 30, 1932

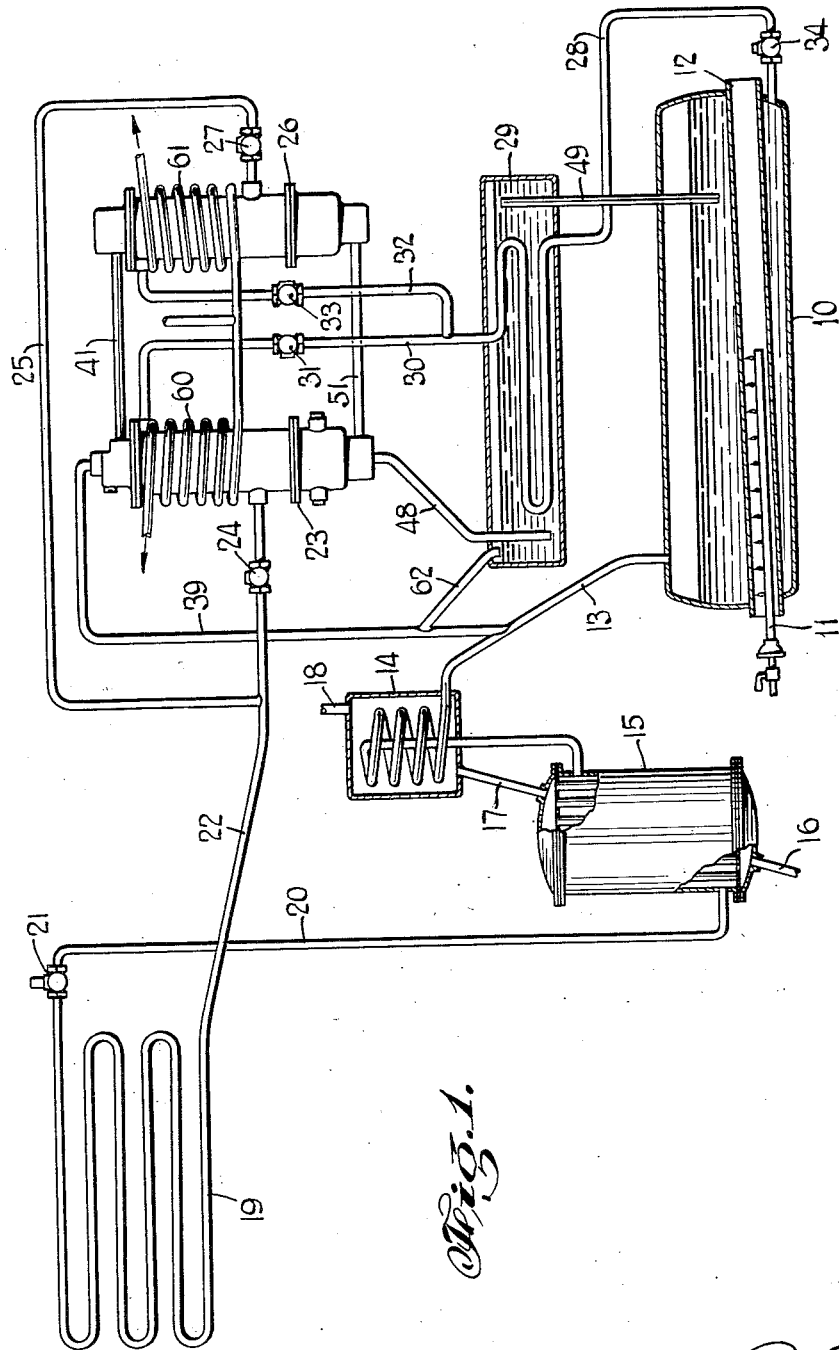

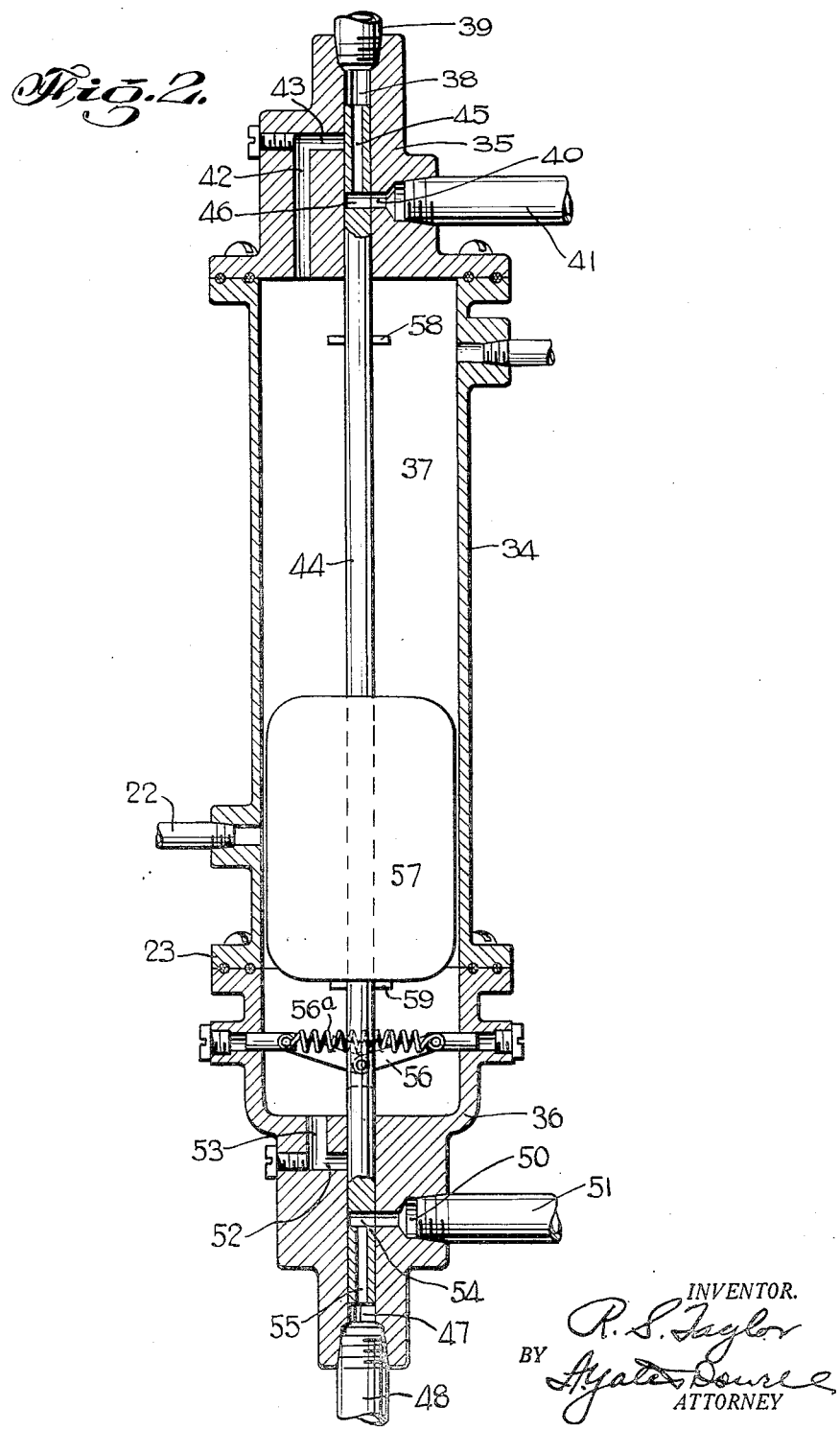

1,874,654

UNITED STATES PATENT OFFICE

ROBERT S. TAYLOR, OF EVANSVILLE, INDIANA, ASSIGNOR TO ELECTROLUX SERVEL CORPORATION, OF NEW YORK, N. Y., A CORPORATION OF DELAWARE

CONTINUOUS ABSORPTION REFRIGERATING APPARATUS

Application filed November 19, 1930. Serial No. 496,599.

This invention relates to absorption refrigerating systems of the two-pressure type in which there is continuous heating of the boiler and more particularly to a means for returning strong liquor to the boiler directly from the absorber in such systems.

This invention contemplates an absorption refrigerating system in which the boiler is continuously heated and absorption takes place alternately in two absorbers, the strong liquor from one absorber being transferred to the boiler while the other absorber is connected in the system and functioning as an absorber.

One object of this invention is to eliminate the intermediate or equalizing vessel heretofore employed in a two-pressure type of continuous absorption system when no pumps are used. The invention will be readily understood by referring to the following description taken in connection with the accompanying drawings in which;

Fig. 1 is a diagrammatic view of a refrigerating system contemplated by this invention, and Fig. 2, a detail vertical section of the primary absorber.

Referring to Fig. 1 of the drawings, a boiler 10 containing a solution of refrigerant such as ammonia, in an absorption liquid such as water, is heated by some means such as burner 11 in flue 12. Ammonia vapor driven out of solution in boiler 10 passes through conduit 13 and rectifier 14 into condenser 15. The condenser and rectifier may be cooled by water flowing from conduit 16 through condenser 15 and conduit 17 into rectifier 14, and discharging through conduit 18. Liquid ammonia from the condenser 15 passes to the refrigerating coil 19 through conduit 20 in which there is an expansion valve 21. Due to the decrease in pressure through the expansion valve 21, the ammonia vaporizes in the coil 19 absorbing heat from the surrounding region which may be the interior of a refrigerating chamber.

Ammonia vapor passes from the refrigerating coil 19 through conduit 22 in which there is a check valve 24 to the primary absorber 23. Conduit 25 branching off from conduit 22, conducts ammonia vapor to the secondary absorber 26 through a check valve 27. Weak liquor from the bottom of boiler 10 passes under boiler pressure through conduit 28 and heat exchanger 29 to primary absorber 23 through conduit 30 in which there is a check valve 31. A conduit 32 branching off from conduit 30 conducts weak liquor to the secondary absorber 26 through check valve 33. The weak liquor flow from the boiler may be controlled by a valve 34 in conduit 28 which valve may be thermostatically operated responsive to the boiler temperature.

The primary absorber 23 shown in detail in Fig. 2 comprises a cylindrical casing 34, closed at its upper end by a detachable head 35 and at its lower end by a detachable head 36, enclosing a fluid tight chamber 37. In the upper head 35, there is a valve port 38 which communicates with the vapor space in the boiler 10 through conduit 39 and there is a second valve port 40 which communicates with the secondary absorber 26 through conduit 41. A passage 42 in the head 35 affords communication between the absorber chamber 37 and a third valve port 43. The upper end of a valve stem 44 is drilled to form intersecting passages 45 and 46. In the normal or lower position of the valve stem 44, the port 38 is open through passages 45 and 46 in the valve stem to port 40, thus forming a normally open communication between conduits 39 and 41. In the upper position of the valve stem, port 40 is closed and port 38 is opened into chamber 37 through passages 45 and 46 in the valve stem and port 42 and passage 43 in the head 35.

In the lower head 36 of the primary absorber, a valve port 47 communicates with the boiler through conduit 48, heat exchanger 29 and conduit 49. A second valve port 50 communicates with the secondary absorber 26 through conduit 51. A third valve port 52 communicates with the lower part of chamber 37 through passage 53 in the head 36. The lower end of the valve stem 44 is drilled to form intersecting passages 54 and 55. In the lower or normal position of the valve stem 44, valve port 50 is opened to port 47 through passages 54 and 55 in the valve stem. In the upper or operated position of the valve stem, port 50 is closed, and port 47 is opened to chamber 37 through passages 55 and 54 in the valve stem, port 52, and passage 53 in the head 36.

Valve stem 44 is normally retained in its lower position by a spring tensioned snap-operating toggle arrangement 56 which is fully described in my co-pending application, filed of even date herewith. The valve stem 44 is snapped into its upper or operated position by the toggle which is shifted by float 57 responsive to the liquid level in chamber 37. As float 57 moves upwardly responsive to a rise in liquid level, it contacts pin 58 on the valve stem to move the latter upwardly and shifts the snap-acting toggle 56. As the float falls, due to the decrease in liquid level as hereinafter described, it releases the valve stem which is held in position by the toggle. When the float has dropped a predetermined distance it contacts a lower pin 59 on the valve stem and the weight of the float shifts the toggle downwardly which snaps the valve stem 44 back to its lower or normal position.

The absorbers may be cooled as usual by water flowing through coil 60 around the primary absorber 23 and coil 61 around the secondary absorber 26. Strong liquor from the absorbers flows through conduit 48 as hereinafter described to the heat exchanger 29 from which is overflows into the boiler 10 through conduit 49. A conduit 62 is connected between the heat exchanger 29 and vapor line 39 from the boiler thereby maintaining boiler pressure within the heat exchanger 29 so that strong liquor therein will overflow into conduit 49 and return to the boiler by gravity.

In the operation of this system, ammonia vapor from the refrigerating coil 19 is delivered to primary absorber 23 through conduit 22 and check valve 24, and to the secondary absorber 26 through conduit 25 and check valve 27. Weak ammonia liquor from the boiler 10 is delivered to the primary absorber 23 through conduit 28, heat exchanger 29 and conduit 30. Weak liquor is also delivered to the secondary absorber 26 through conduit 32.

When the primary absorber 23 is empty and the valve stem 44 is in its normal or lower position, chamber 37 receives refrigerant vapor through conduit 22 and weak liquor through conduit 30. There will be no flow of refrigerant or weak liquor into the secondary absorber 26 since the latter is at boiler pressure being open to the vapor space in the boiler through conduit 41, valve port 40 in the primary absorber, passes 46 and 45 in the upper end of valve stem 44, valve port 38, conduit 39, and conduit 13.

As the refrigerant vapor and weak liquor meet in chamber 37 of the primary absorber, the ammonia vapor is absorbed and the liquid level gradually rises. The float 57, rising with the liquid level, contacts pin 58 on the valve stem 44 lifting the latter and shifting the toggle 56 which snaps the valve stem into its operated position. When valve stem 44 is in its operated position, the liquor in chamber 37 is put under boiler pressure since communication is open to the vapor space in the boiler through passage 42 and port 43 in the head 35, passages 46 and 45 in the valve stem 44, port 38, and conduits 39 and 13. At the same time, the lower portion of chamber 37 is opened through passage 53 and port 52 in the lower head 36, passages 54 and 55 in the lower end of valve stem 44, and port 47 to conduit 48 thereby allowing the strong liquor in chamber 37 to flow by gravity into the heat exchanger 29 since the pressures in the absorber and the heat exchanger have been equalized.

When the valve stem 44 in the primary absorber 23 is in its operated position and the strong liquor in this absorber is being discharged into the heat exchanger, port 40 in the upper head is closed cutting off the vapor under boiler pressure from the secondary absorber 26 and port 50 in the lower head 36 is closed cutting off the lower portion of secondary absorber 26 from the heat exchanger 29. Ammonia vapor will now enter the secondary absorber 26 through conduit 25 and weak liquor will enter the secondary absorber through conduit 32 and absorption of the vapor in the weak liquor will take place. This will continue while the strong liquor is discharging from the primary absorber into the boiler through heat exchanger 29. When the liquor level in the primary absorber has receded a predetermined distance, the float will shift the snap-acting toggle mechanism as described, and the valve stem 44 will be snapped back into its lower or normal position, thus cutting off boiler pressure to the primary absorber and putting the secondary absorber under boiler pressure. The strong liquor in the secondary absorber 26 will now discharge through conduit 51, port 50 passages 54 and 55 in the valve stem, port 47, and conduit 48 to the heat exchanger 29 and then back to the boiler 10 through conduit 49 as described above. Thus the secondary absorber 26 functions as the absorber in the system while the primary absorber 23 is discharging strong liquor back to the boiler.

It will be obvious to those skilled in the art that various other changes may be made in the construction and arrangement without departing from the spirit of the invention and therefore the invention is not limited to what is shown in the drawings and described in the specification but only as indicated in the appended claims.

I claim:

1. A refrigerating system of the absorption type including two absorbers, a refrigerant vapor line communicating with both absorbers, a weak liquor line comunicating with both absorbers, a pressure equalizing line from the boiler, a strong liquor return line to the boiler, and means for simultaneously closing the pressure equalizing line and strong liquor return line to one absorber, and opening the pressure equalizing line and strong liquor return line to the other absorber.

2. A refrigerating system of the absorption type including a primary absorber, a secondary absorber, a pressure equalizing line from the boiler, a strong liquor return line to the boiler, and means associated with the primary absorber for simultaneously connecting the pressure equalizing line and the strong liquor return line to the primary absorber and disconnecting the pressure equalizing line and strong liquor return line from the secondary absorber.

3. In a refrigerating system of the absorption type, a generator, a primary absorber, a secondary absorber, a condenser and expansion coil connected in series with the generator, a conduit from said refrigerating coil communicating with both absorbers, a conduit from the lower part of said boiler adapted to be connected to the upper part of either absorber, a conduit from said boiler adapted to be connected to the lower part of either absorber, and means to simultaneously change the connections of the last two said conduits from the secondary absorber to the primary absorber, said means being responsive to the liquid level in the primary absorber.

4. A refrigerating system of the absorption type including a primary absorber, a secondary absorber, a pressure equalizing line, a strong liquor return line, and means associated with said primary absorber for simultaneously changing the connections of the pressure equalizing line and the strong liquor return line from one of said absorbers to the other, said means being responsive to the liquid level in the primary absorber.

5. A refrigerating system of the absorption type including a primary absorber, a secondary absorber, a pressure equalizing line, a strong liquor return line, and snap-acting means associated with said primary absorber for simultaneously changing the connections of the pressure equalizing line and the strong liquor return line from one of said absorbers to the other, said means being responsive to the liquid level in the primary absorber.

6. In a refrigerating system of the absorption type, a primary absorber, a secondary absorber, a pressure equalizing line, a strong liquor return line, a two-way valve in the upper part of the primary absorber, a two-way valve in the lower part of the primary absorber, said first valve being adapted to shift the connection of the pressure equalizing line from the primary absorber to the secondary absorber and said second valve being adapted to shift the connection of the strong liquor return line from primary absorber to the secondary absorber, a snap-acting means for simultaneously operating said valves, and a float in the primary absorber for controlling said means.

7. In an absorption refrigerating system, a primary absorber, a secondary absorber, a pressure equalizing line, a strong liquor return line, a two-way valve connecting said pressure equalizing line to the secondary absorber in its normal position and to the primary absorber in its operated position, a second two-way valve connecting said strong liquor return line to the primary absorber in its operated position and to the secondary absorber in its normal position, and a snap-acting means for simultaneously operating said valves responsive to the liquid level in the primary absorber.

8. In an absorption refrigerating system, a primary absorber, a secondary absorber, a pressure equalizing line, a strong liquor return line, a valve adapted in its normal position to connect the pressure equalizing line to the secondary absorber and in its operated position to connect the pressure equalizing line to the primary absorber, a second valve adapted in its operated position to connect the strong liquor return line to the primary absorber and in its normal position to connect the strong liquor return line to the secondary absorber, a snap-acting means for simultaneously operating said valves, and a float in said primary absorber for controlling said snap-acting means.

9. In an absorption refrigerating system, a primary absorber, a secondary absorber, a pressure equalizing line, a strong liquor return line, a valve adapted in its normal position to connect the pressure equalizing line to the secondary absorber and in its operated position to connect the pressure equalizing line to the primary absorber, a second valve adapted in its normal position to connect the strong liquor return line to the secondary absorber and in its operated position to connect the strong liquor return line to the primary absorber, a snap-acting toggle for simultaneously operating said valves, and a float in said primary absorber for shifting said toggle.

In testimony whereof I affix my signature.

ROBERT S. TAYLOR.